G. NEALY.
BELT TIGHTENING MEANS.
APPLICATION FILED DEC. 21, 1910.
1,047,830.
Patented Dec. 17, 1912.
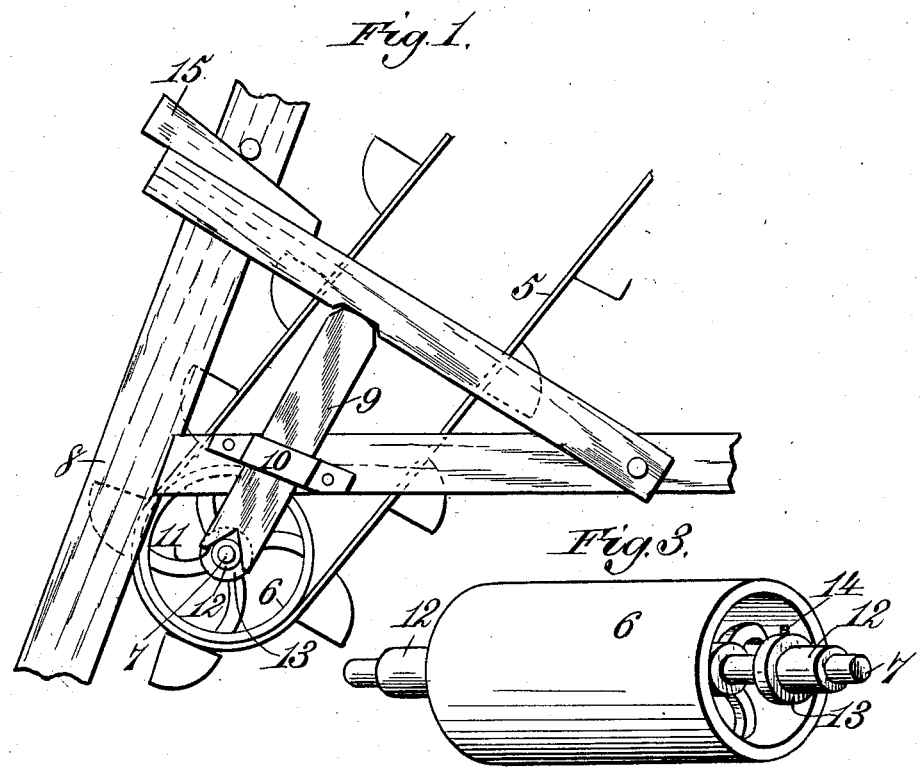
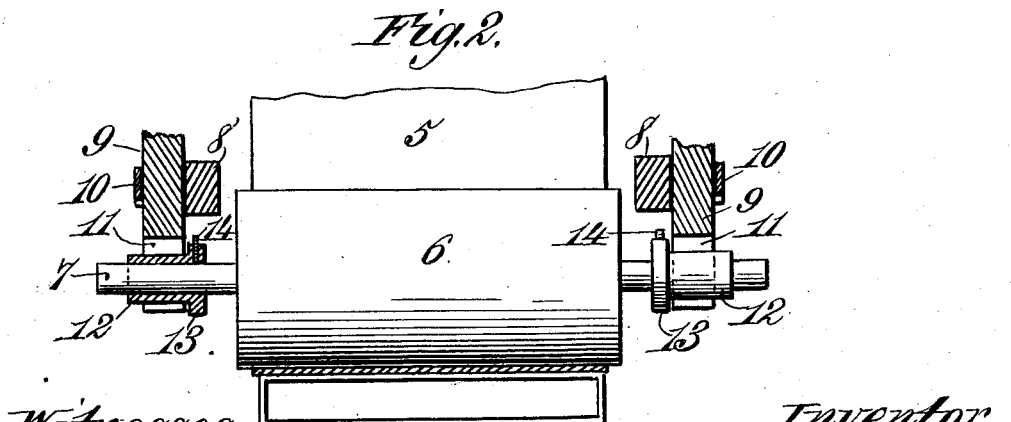
Witnesses.
Robert Everitt
Inventor.
George Nealy.
By James L. Norris

UNITED STATES PATENT OFFICE.

GEORGE NEALY, OF WEBB CITY, MISSOURI, ASSIGNOR OF ONE-HALF TO F. C. WALLOWER, OF WEBB CITY, MISSOURI.

BELT-TIGHTENING MEANS.

1,047,830.  Specification of Letters Patent.  Patented Dec. 17, 1912.

Application filed December 21, 1910. Serial No. 598,653.

*To all whom it may concern:*

Be it known that I, GEORGE NEALY, a citizen of the United States, residing at Webb City, in the county of Jasper and State of Missouri, have invented new and useful Improvements in Belt-Tightening Means, of which the following is a specification.

This invention relates to means for compensating for wear at the bearings of the shafts for the pulleys or drums of conveyers and analogous structures, and the primary object of the same is to provide a simple and effective organization of elements which permits adjustment of pulleys or drums of conveyers for tightening the belts or carriers and for maintaining such pulleys or drums more nearly in true position so that they will run regularly, and wherein also the shafts or spindles of the pulleys or drums are prevented from having the wear of the bearing parts directly imposed thereon.

A further object of the invention is to provide the spindles or shafts of conveyer pulleys or drums with removable sleeves which serve also as set collars relatively to the bearing means in which the spindles or shafts are adjustably mounted, and jacks with specially formed notches or recesses at their lower ends to engage the sleeves for the purpose of rendering the wear more uniform on the jacks and to remove the wear directly from the pulley or drum spindles or shafts.

With these and other objects and advantages in view the invention consists in the construction and arrangement of the several parts which will be more fully hereinafter specified.

In the drawing: Figure 1 is a side elevation of a portion of a conveyer and bearing means therefor showing the features of the invention applied thereto. Fig. 2 is an elevation of the end of the lower portion of the conveyer partially in section. Fig. 3 is a detail perspective view of the drum at the lower extremity of the conveyer and showing the removable wear sleeves on the shaft or spindle thereof.

The numeral 5 designates a conveyer belt of any preferred structure which is trained over a lower pulley or drum 6 fast on a shaft or spindle 7 which is adjustably mounted in a suitable frame means 8 so as to have vertical movement to take up slack in or tighten the conveyer belt 5. In the frame means 8, jacks 9 are mounted, guides 10 being provided to receive the said jacks. The jacks 9 are preferably formed of hard wood, such as oak, and each has an inverted V-shaped notch or recess 11 in its lower end. On the shaft or spindle 7 of the drum at each extremity is a wear sleeve 12 having an inner circumferential shoulder 13 and held in removable applied position by a set-screw 14 extending through the shoulder 13. Each wear sleeve and its shoulder may be adjusted on the shaft or spindle extremity which it engages as may be found desirable and the inner face or side of the circumferential shoulder 13 is brought to bear against or adjacent to the outer portion of the bearing in which the shaft or spindle extremity is fitted, and as there is a wear sleeve and circumferential shoulder on each extremity of the shaft or spindle the pulley or drum 6 may thus be maintained in central position within the bearing means and prevented from having lateral shifting movement. The wear sleeves 12 are long enough to fully protect the portions of the shaft or spindle extremities with which they engage, and the lower notched or recessed extremities of the jacks are driven downwardly over and bear upon the said wear sleeves as shown by Fig. 1. The jacks are driven down in the bearing means to tighten the belt 5 and are held in their adjusted position by suitable wedges 15 engaging the upper portions of the same. By slightly loosening and raising the jacks the belt 5 may be slackened if found desirable or necessary. In either event, however, the wear sleeves always engage the lower notched extremities of the jacks and by reason of the increased diameter provided by said sleeves the wear on the jacks is slower than if the shaft extremities directly engaged the jacks, and furthermore, wear is removed from the shaft or spindle extremities and imposed wholly on the removable sleeves with material advantage from a standpoint of economy as the sleeves can be replaced by similar devices at a materially less cost than would be necessary to renew the shaft or spindle. A still further advantage of the improved structure is that the pulley or drum 6 can more easily be maintained in true running position with obvious advantages in the operation of the belt 5. In ordinary structures of this type, grit becomes interposed between the shaft or spindle extremities and the bearing means therefor, or jacks, and as a consequence the bearing means or jacks are soon worn and the pulley or drum runs irregularly, and at the same time the shaft or spindle extremities have grooves formed therein by abrasion and at a considerable expense must be replaced by a new shaft or spindle with true extremities in order to maintain the pulley or drum in regular running condition. The features of the invention involving the notched or recessed jacks and the wear sleeves obviate the disadvantages just enumerated, and to make the wear sleeves still more effective it is proposed to chill the wearing ends thereof when they are cast to harden the same and thereby resist wear thereof for a longer period of time.

The improved features coöperating with the shaft or spindle extremities of the pulleys or drums of conveyers, as hereinbefore explained, may be provided at a comparatively small cost, and it is obvious that changes in the proportions and dimensions of the several parts may be adopted to accommodate various applications without departing from the spirit of the invention.

What is claimed is:

The combination with a frame and a shaft mounted therein, a pulley thereon, the extremities of the shaft projecting outwardly at opposite sides of the frame, of wear sleeves mounted on the opposite projecting extremities of the shaft and removably fixed to the latter, the said sleeves having integral circumferential shoulders at their inner terminals adjacent to and out of contact with the opposite extremities of the pulley and the hub of the latter, the wear sleeves also serving as set collars to limit the lateral movement of the pulley on the shaft, and upwardly projecting jacks applied to opposite side portions of the frame and having lower notched ends opening fully through the bottom of the latter and fitted over the upper portions of the sleeves outside of the circumferential shoulders, the jacks having their upper ends engaged by adjustable pressure devices also carried by the frame, the jacks being prevented from having lateral movement relatively to the sleeves and shaft extremities.

In testimony whereof I have hereunto set my hand in presence of two subscribing witnesses.

GEORGE NEALY.

Witnesses:
F. C. WALLOWER,
HARRY B. HULETT.

---

Copies of this patent may be obtained for five cents each, by addressing the "Commissioner of Patents, Washington, D. C."